(12) United States Patent
Simony (10) Patent No.: US 7,667,181 B2
(45) Date of Patent: Feb. 23, 2010

(54) METHOD AND CIRCUIT FOR OBTAINING A SAMPLE IN AN IMAGE SENSOR

(75) Inventor: Laurent Simony, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 12/060,697

(22) Filed: Apr. 1, 2008

(65) Prior Publication Data

US 2008/0237448 A1 Oct. 2, 2008

(30) Foreign Application Priority Data

Apr. 2, 2007 (FR) .................................. 07 54222

(51) Int. Cl.
*H01J 40/14* (2006.01)
*H04N 5/217* (2006.01)
(52) U.S. Cl. ................................... 250/214 R; 348/241
(58) Field of Classification Search .............. 250/208.1, 250/214 R, 214.1; 348/241, 302, 308, 294–299
See application file for complete search history.

(56) References Cited

U.S. PATENT DOCUMENTS

| 6,870,496 | B2 * | 3/2005 | Krymski et al. ............. 341/172 |
| 2005/0030401 | A1 | 2/2005 | Ovsiannikov et al. |
| 2005/0280737 | A1 | 12/2005 | Takayanagi |
| 2006/0119717 | A1 * | 6/2006 | Barna ........................ 348/300 |
| 2006/0170794 | A1 * | 8/2006 | Higuchi et al. .............. 348/241 |
| 2006/0170803 | A1 * | 8/2006 | Lim ........................... 348/308 |
| 2006/0227226 | A1 | 10/2006 | Olsen |
| 2006/0278809 | A1 | 12/2006 | Takayanagi |

* cited by examiner

*Primary Examiner*—Georgia Y Epps
*Assistant Examiner*—Jennifer Bennett
(74) *Attorney, Agent, or Firm*—Lisa K. Jorgenson; Eric M. Ringer; Seed IP Law Group PLLC (57) ABSTRACT

An image sensor and a method for acquiring images by sampling of the level of a voltage representative of the charge of a photodiode, in which a first sample is taken during a reset of the charge level of the photodiode; and a second sample is taken provided that the decrease slope of the voltage after the reset is lower than a threshold, said second sample replacing the first one.

28 Claims, 6 Drawing Sheets

METHOD AND CIRCUIT FOR OBTAINING A SAMPLE IN AN IMAGE SENSOR

BACKGROUND

1. Technical Field

The present invention generally relates to image sensors made in monolithic form and used in digital image acquisition devices such as cameras and photographic devices. The present invention relates to such devices, whether they are autonomous or belong to a device comprising other functions such as, for example, a cell phone or an automobile vehicle. The present invention more specifically relates to a so-called anti-eclipse system of an image sensor designed to avoid for a strong lighting to translate as black.

2. Description of the Related Art

An image sensor pixel comprises a photodiode used in reverse and having its junction capacitance discharged by a photocurrent according to a received light intensity. Obtaining the lighting level received by a pixel includes measuring the voltage across the photodiode at selected times, among which the end of a so-called image acquisition or integration period before and after which the pixel is reset by recharging of its photodiode. The decrease of the voltage across the photodiode during the acquisition period is proportional to the photocurrent having discharged its capacitance. For strong light intensities, the photocurrent may be such that the discharge of the junction capacitance during the acquisition phase adversely affects the reliability of the measurement. In particular, when the lighting increases beyond a given value, the electric signal provided by the sensor decreases down to zero. This so-called eclipse phenomenon results in that a very strongly lit area is interpreted as black (which is for example the case for the filament of an incandescent lamp).

US Patent Application No. 2006/0278809 describes an anti-eclipse system for an image sensor having its pixels formed of four transistors, that is, using a technique of charge transfer from the photodiodes to intermediary capacitive nodes of each pixel, to temporarily store the charges before reading by transfer to a column conductor common to several pixels. Such sensors are generally called 4 T sensors as opposed to so-called 3 T sensors having their pixels formed of three transistors and which comprise no intermediary capacitive node.

BRIEF SUMMARY

One embodiment all or part of the disadvantages of known image sensors.

One embodiment includes an anti-eclipse solution.

One embodiment is a solution compatible with 3 T and 4 T sensors.

One embodiment is a solution that does not require a modification of the structure of the pixels of a current image sensor.

One embodiment is a method for acquiring images by sampling of the level of a voltage representative of the charge of a photodiode, in which:

a first sample is taken during a reset of the charge level of the photodiode; and a second sample is taken provided that the decrease slope of the voltage after the reset is lower than a threshold, said second sample replacing the first one.

According to an embodiment, the second sample is taken after a time period corresponding to the sum of a voltage level settling time and of a time of determination of said slope.

According to an embodiment, the level of the first sample is corrected by a value corresponding to a coupling voltage.

One embodiment is an image sensor comprising an array of image acquisition cells, each provided with at least one photodiode, the cells being interconnected in a first direction to first conductors connectable to sampling capacitors, and the image sensor comprises, for each first conductor, a circuit for implementing the acquisition method.

According to an embodiment, each cell comprises at least one first transistor having its gate likely to receive a signal for resetting the charge of the photodiode, and at least one second transistor in series with a third transistor between a supply terminal and one of said first conductors, the gate of the second transistor being connected to the cathode of the photodiode and the gate of the third transistor being connected to a second conductor interconnecting the cells in a second direction.

According to an embodiment, said circuit comprises a comparator estimating the variation of the signal present on said first conductor with respect to a threshold.

According to an embodiment, an output of said comparator is connected to the input of a digital level regeneration element having an output combined with a sampling signal to provide a signal for controlling a sampling transistor interposed between the first conductor to which is connected the cell and a first sampling capacitor.

According to an embodiment, said element is a flip-flop.

The foregoing and other features, and advantages will be discussed in detail in the following non-limiting description of specific embodiments in connection with the accompanying drawings.

DETAILED DESCRIPTION

The same elements have been designated with the same reference numerals in the different drawings which have been drawn out of scale.

For clarity, only those steps and elements useful to the understanding of the present invention have been shown and will be described. In particular, the generation of the control signals of an image sensor has not been detailed, the implementation of the present invention being compatible with usual synchronization systems generating time synchronization signals. The destination of the signals output by the image sensor has not been detailed either, the present invention being here again compatible with any conventional exploitation of such signals.

Figure 1:
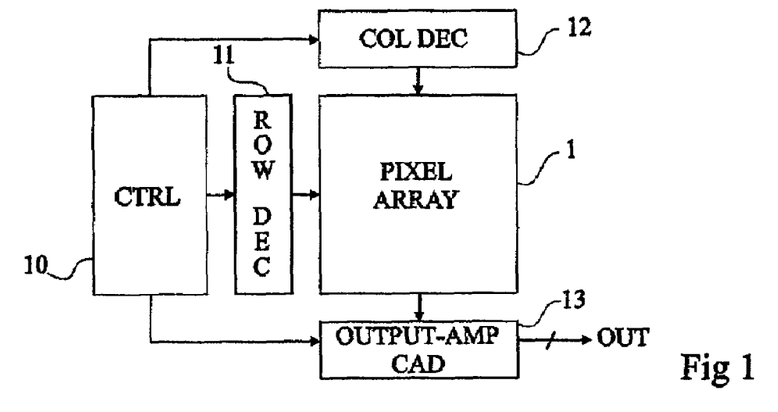
FIG. 1 is a block diagram of an example of an image acquisition device.

FIG. 1 is a block diagram of an example of an image acquisition device. This device comprises an image sensor 1 (PIXEL ARRAY) comprising an array of elementary cells or pixels at the intersection of lines and columns. The acquisition device also comprises an electronic control circuit 10 (CTRL) driving, among others, a line or row decoding circuit 11 (ROW DEC), a column decoding circuit 12 (COL DEC) and a circuit 13 of output amplifiers (OUTPUT AMP) or of analog-to-digital converters (generally one per column) providing digital signals OUT representative of the lighting of the different pixels. These digital signals are exploited by a device (not shown) associated with the image acquisition device and comprising, for example, circuits for storing values assigned to the different pixels and for processing images.

Figure 2:
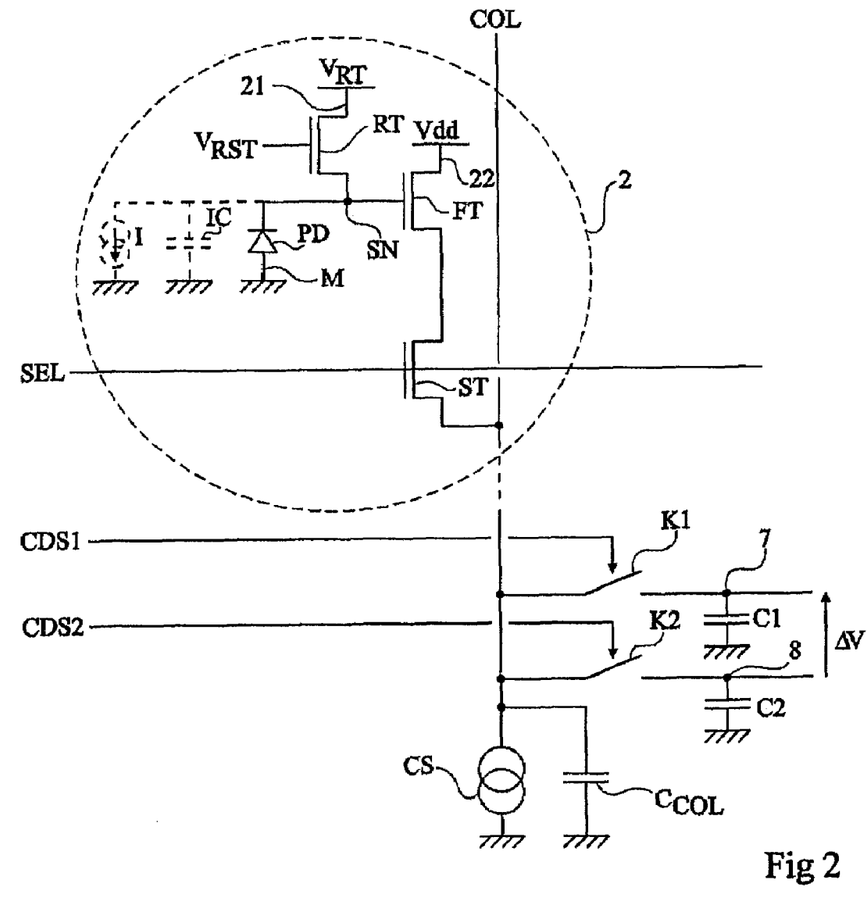
FIG. 2 shows an example of an image sensor pixel with no anti-eclipse circuit.

FIG. 2 is an example of an equivalent electric diagram of a pixel 2 of a 3 T image sensor. Pixel 2 comprises a photodiode PD used in reverse and having its junction capacitance (IC in dotted lines) discharged by the photocurrent (I in dotted lines) according to the received light intensity. The anode of photodiode PD is connected to a reference voltage (ground M) and its cathode is connected to a node SN. Node SN is connected, by a reset transistor RT (an N-channel MOS transistor), to a terminal 21 for providing a voltage $V_{RT}$ positive with respect to reference voltage M. Transistor RT receives, on its gate, a dual-state signal $V_{RST}$ for controlling periods of application of a voltage setting, in a first state, the reset level of the node SN of all the cells in a line. In a second state of signal $V_{RST}$, transistor RT is off. Signal $V_{RST}$ is common to all the cells in a same line. Node SN is further connected to the gate of a transistor FT (an N-channel MOS transistor) assembled as a follower source, having its drain connected to a terminal 22 for providing a voltage Vdd, positive with respect to reference voltage M. The source of transistor FT is connected by a selection transistor ST, here, an N-channel MOS transistor, to a column conductor COL, called a bit line, of array 1 (FIG. 1). Transistor ST is controlled by a line or row selection signal SEL, common to all the cells in a same row. Transistor FT forwards the voltage information of node SN onto column conductor COL. This information is exploited by two capacitive sampling elements C1 and C2 connecting, respectively with switches K1 and K2 controlled in all or nothing by signals CDS1 and CDS2, column conductor COL to ground M. Signals CDS1 and CDS2 are provided by control circuit 10 (FIG. 1). The column conductor is further grounded by a current source CS and by a stray column capacitor $C_{COL}$.

Capacitors C1 and C2 are used at different times to perform a double correlated sampling for each image acquisition. The difference between the voltage that they store (levels on the respective positive electrodes 7 and 8) provides a differential voltage for exploitation by the downstream circuits (for example, digitization, storage, etc.).

In the case of a 4 T sensor, a transfer transistor (not shown) is interposed between the cathode of the photodiode and node SN. This transistor is used to transfer, for each pixel, the charges from its photodiode to node SN.

Figure 3A:
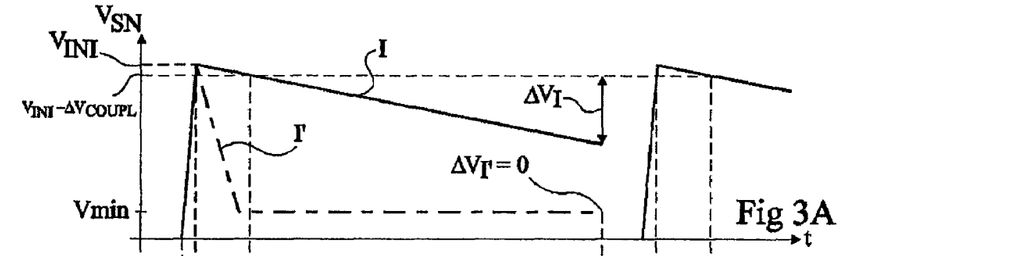
FIGS. 3A, 3B, 3C and 3D illustrate the operation of the pixel of FIG. 2.
Figures 3B, 3C:
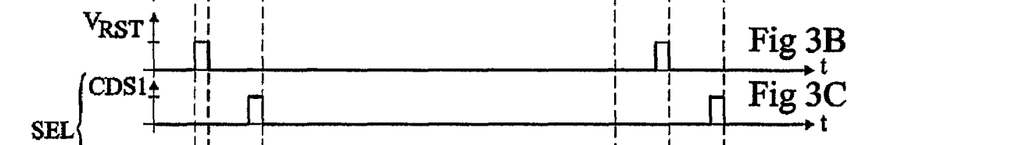
Figure 3D:
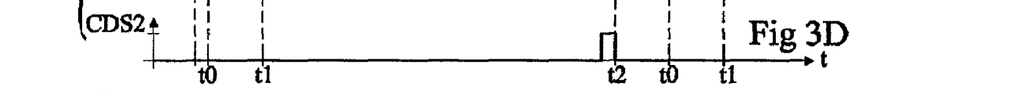

FIGS. 3A, 3B, 3C, and 3D are timing diagrams illustrating the operation of the sensor of FIG. 2 (3 T sensor). FIG. 3A shows examples of the variation of voltage $V_{SN}$ across photodiode PD. FIG. 3B is an example of the shape of signal $V_{RST}$. FIGS. 3C and 3D illustrate shapes of signals CDS1 and CDS2.

Signal $V_{RST}$ is activated before each acquisition phase to set node SN to a given voltage $V_{INI}$. As soon as a high voltage is applied on selection signal SEL to turn on selection transistor ST, a current flows through follower transistor FT, which forwards the voltage information of node SN to column conductor COL. This information can then be sampled by capacitors C1 and C2 at two successive times t1 and t2 under control of signals CDS1 and CDS2. A first sampling (times t1 corresponding to the edges, for example, falling, of signal CDS1) is performed right after the reset period to obtain a reference state and a second sampling is performed at the end of the integration period (time t2 corresponding to the edges, for example, falling, of signal CDS2). The double sampling enables avoiding possible dispersions of the threshold voltage of follower transistor FT from one pixel to the other. In practice, the voltage stored by capacitor C1, used as a reference to calculate voltage difference $\Delta V$ between capacitors C1 and C2, is obtained after a reset subsequent to the sampling (t2) at the end of the integration period.

During the integration period (between times t1 and t2), voltage $V_{SN}$ (FIG. 3A) decreases under the effect of the light intensity received by the photodiode. Difference $\Delta V_I$ between the levels of node SN between times t2 and t1 provides voltage information proportional to the lighting. This difference is calculated and exploited by the downstream processing circuits.

The eclipse effect is illustrated in FIG. 3A by a second example of shape I' in which the current decrease is such that level $V_{SN}$ reaches a minimum level Vmin (full discharge of the photodiode) before time t1. As a result, difference $\Delta V_{I'}$ between the levels measured at times t1 and t2 is zero, that is, represents the absence of any lighting while in fact the lighting is maximum.

It could have been devised to decrease the interval between times t0 and t1. However, this interval allows transistor FT to operate properly, as will be explained hereafter.

Figure 4A:
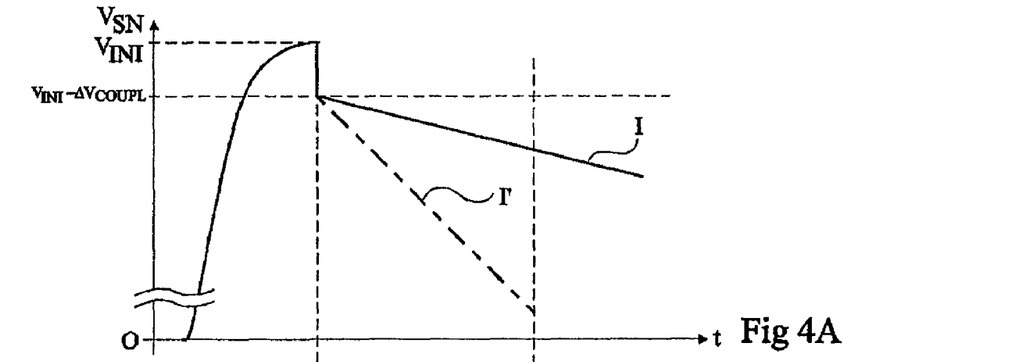
FIGS. 4A, 4B, 4C and 4D illustrate a detail of the operation of the pixel of FIG. 2.
Figure 4B:
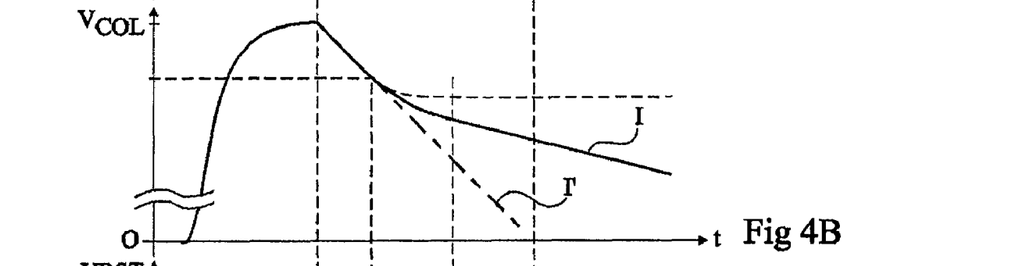
Figure 4C:
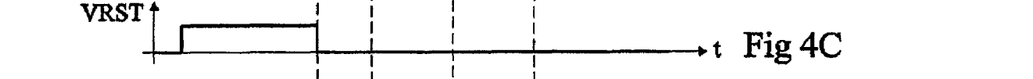
Figure 4D:
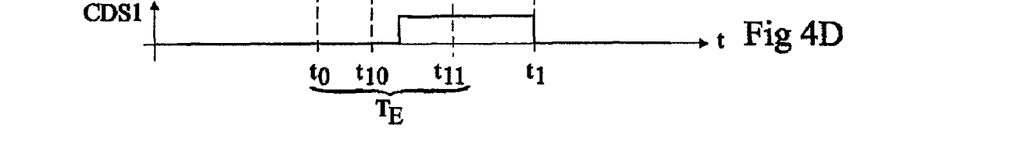

FIGS. 4A, 4B, 4C, and 4D illustrate the operation of the sensor of FIG. 2 by timing diagrams temporally enlarged in the vicinity of times t0 and t1. FIG. 4A shows the examples of shapes of FIG. 3A. FIG. 4B shows the corresponding shape of level $V_{COL}$ of conductor COL. FIG. 4C illustrates the shape of signal $V_{RST}$. FIG. 4D illustrates the shape of signal CDS1.

At time t0 representing the falling edge of voltage $V_{RST}$, voltage $V_{SN}$ exhibits a falling edge from level $V_{INI}$ to reach a level $V_{INI}-\Delta V_{COUPL}$, where $\Delta V_{COUPL}$ represents the value of a negative coupling due to the turning-off of transistor RT. This edge temporarily turns off transistor FT since its gate voltage falls faster than its source voltage due to the relatively high column capacitance $C_{COL}$. As a result, voltage $V_{COL}$ decreases until a time t10 with a slope independent from the variation of the voltage of node $V_{SN}$. From time t10, transistor FT progressively turns back on but it takes a time t11 for the column voltage to be accurately settled and to become representative again of the voltage of node SN. Time interval $T_E$ between times t0 and t11 is incompressible for a given sensor (it takes a sufficiently long time to obtain the settling accuracy). It imposes for time t1 to be subsequent to time t11, whereby interval t0-t1, which generates eclipse phenomena by loss of the reference for the double correlated sampling as soon as the discharge of the junction capacitance of photodiode PD becomes significant in the interval between times t0 and t1. Typically, the dead time (interval between times t0 and t1) before the beginning of the acquisition phase is shorter than 1 microsecond.

In a normal case (example of photocurrent I in the drawings), voltage $V_{COL}$ takes value $V_{COL}(t1)=V_{INI}-\Delta V_{COUPL}-V_T(FT)$ at time t1, neglecting the series voltage drop in transistor ST, where $V_T(FT)$ represents the gate-source voltage of transistor FT. This value becomes, when the second sample is taken (time t2), $V_{COL}(t2)=V_{INI}-\Delta V_{COUPL}-\Delta V_I-V_T(FT)$.

The difference effectively represents $\Delta V_I$. However, in the example of too strong a lighting I', value difference $\Delta V_I$ progressively becomes zero when the lighting increases due to an incorrect reference at time t1.

Figure 5:
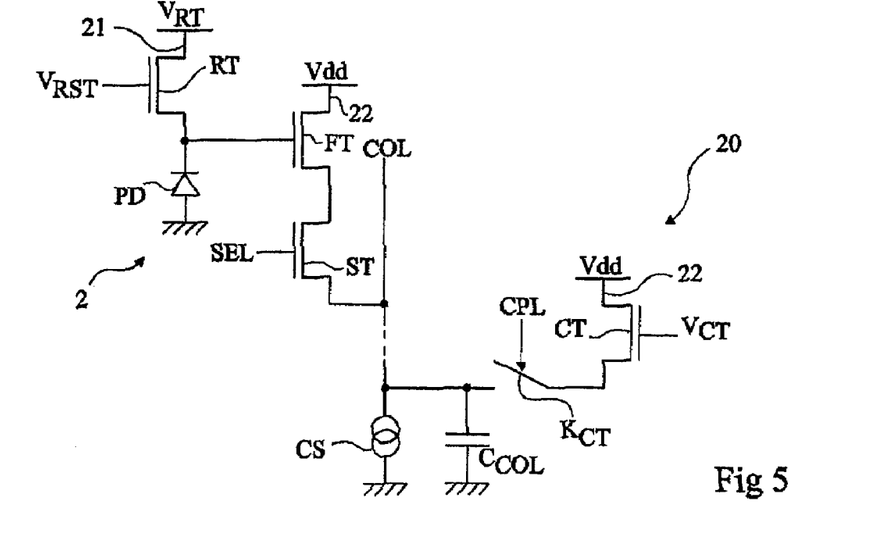
FIG. 5 shows an example of a usual anti-eclipse circuit.

FIG. 5 shows an example of a usual anti-eclipse technique. An anti-eclipse circuit 20 is associated with each column COL of the image sensor having its pixels, in this example, identical to the sensor pixels described in relation with FIG. 2. The aim is, in case of a strong lighting, to avoid a strong drift in column voltage $V_{COL}$ at the beginning of the integration period. Circuit 20 then applies a voltage $V_{CT}$ on the column to maintain voltage $V_{COL}$. In the shown example, this voltage is applied by a transistor CT having a voltage $V_{CT}$ applied to its gate and having its drain connected to supply terminal 22 while its source is connected to column conductor COL by a switch $K_{CT}$ (in practice, a transistor) controlled by a signal CPL.

Switch $K_{CT}$ is on during the signal settling period before acquisition (between times t0 and t11). During this period, transistor CT conducts as soon as voltage $V_{COL}$ becomes smaller than voltage $V_{CT}-V_T(CT)$, where $V_T(CT)$ represents the gate-source voltage of transistor CT. Voltage $V_{CT}$ is selected to be smaller than the level reached at time t1 by a pixel of average lighting, to only limit the negative voltage deviation of the column under a strong lighting.

In the case of a normal lighting resulting in a difference $\Delta V_I$ (from zero to average), transistor CT remains off. The measurement at time t1 provides $V_{COL}(t1)=V_{INI}-\Delta V_{COUPL}-V_T(FT)$. In the second sampling, (time t2), this voltage becomes $V_{COL}(t2)=V_{INI}-\Delta V_{COUPL}-\Delta V_I-V_T(FT)$. Calculating the difference provides voltage $\Delta V_I$, and the possible threshold dispersions of transistor FT and of voltages $V_{INI}$ and $\Delta V_{COUPL}$ are effectively compensated for.

In case of too strong a lighting and of an operation of anti-eclipse circuit 20, the sample at time t1 provides a voltage $V_{COL}(t1)=V_{CT}-V_T(CT)$ while the sample at time t2 provides value $V_{COL}(t2)=V_{INI}-\Delta V_{COUPL}-\Delta V_I-V_T(FT)$. Considering that voltage $V_{CT}$ corresponds to a value close to a maximum lighting, the difference between the two measurements effectively provides information about difference $\Delta V_I$. However, there is no further correlation between the possible dispersions of transistor FT. Further, an additional dispersion, that of transistor CT, is introduced.

Figure 6:
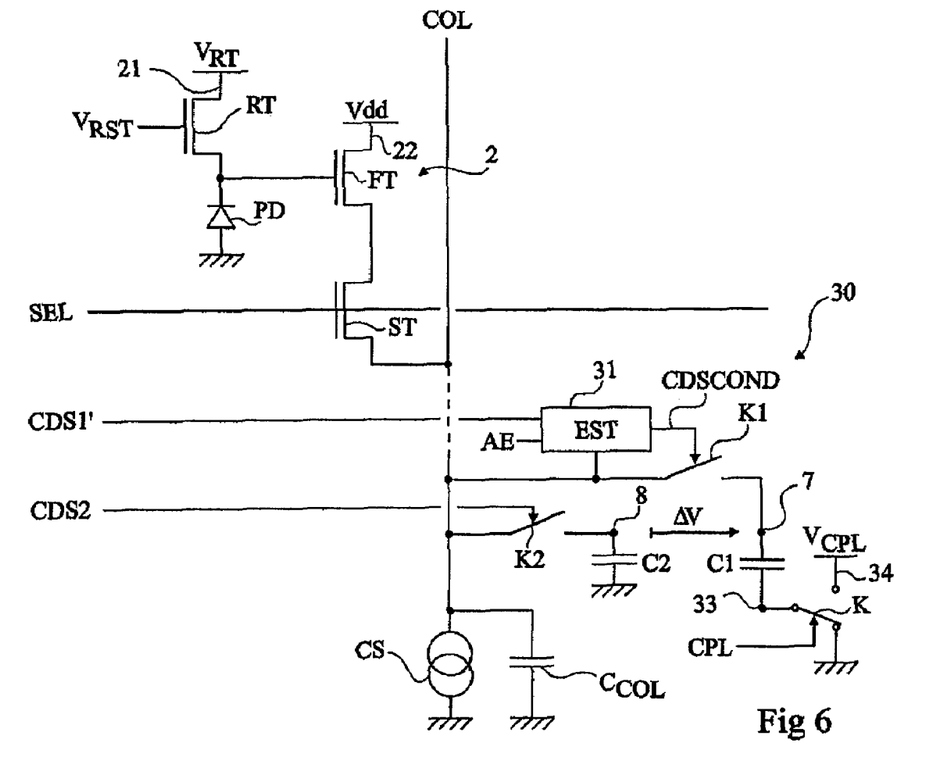
FIG. 6 very schematically and partially shows an embodiment of an image sensor with an anti-eclipse circuit.

FIG. 6 shows an embodiment of an anti-eclipse circuit 30 associated, as in FIG. 5, with a column of an image sensor having its pixels 2 also similar to that shown in FIG. 2. The anti-eclipse circuit 30 is one of a plurality of anti-eclipse circuits respectively coupled to the columns of the image sensor.

Figure 7A:
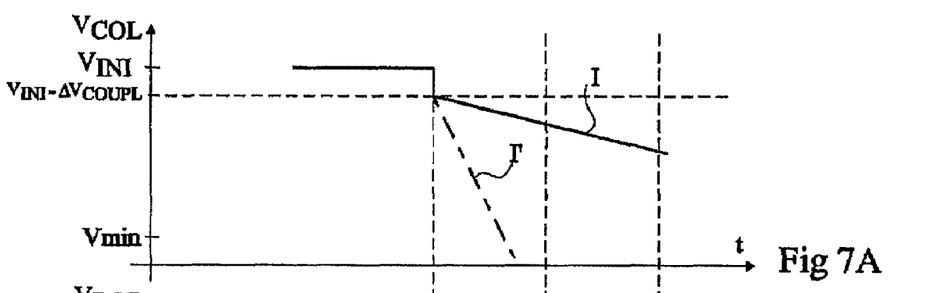
FIGS. 7A, 7B, 7C, and 7D are timing diagrams illustrating the operation of the image sensor of FIG. 6.
Figure 7B:
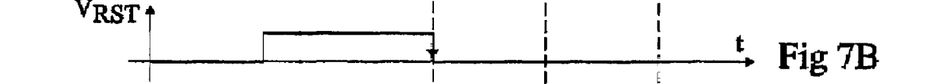
Figure 7C:
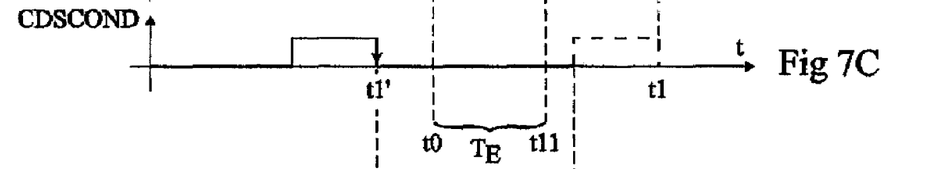
Figure 7D:
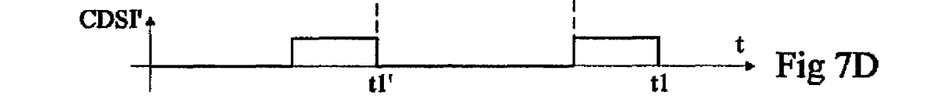

FIGS. 7A, 7B, 7C, and 7D are timing diagrams illustrating the operation of anti-eclipse circuit 30. FIG. 7A shows examples of the shape of signal $V_{COL}$. FIG. 7B shows the shape of signal $V_{RST}$. FIG. 7C shows the shape of a signal CDSCOND representing the sampling times for the reference sample. FIG. 7D shows the shape of a signal CDS1' from which the reference sampling times are obtained.

As compared with the diagram of FIG. 2, switch K1 is controlled by a signal CDSCOND provided by a circuit 31 (EST) receiving a signal CDS1' and sampling information about the level of column conductor COL. As compared with signal CDS1 of FIGS. 4A to 4D, signal CDS1' (FIG. 7D) provided by circuit 10 (FIG. 1) further comprises a pulse (time t1') during each reset period (while signal $V_{RST}$ is active). The function of circuit 31 is to let through a first sampling pulse (t1') of signal CDS1' during the reset period and to make conditional the next pulse (time t1) which corresponds to the usual acquisition period beginning pulse.

Circuit 31 estimates the variation of the column conductor voltage level at the end of signal settling period $T_E$ or just after this period to block the conditional pulse if the variation exceeds a threshold AE. The value taken during first sample t1' is then kept as a reference sample. If conditional sample t1 is taken, it replaces the former one and becomes the reference sample. Signal CDS2 for controlling switch K2 is not modified with respect to usual cases. As a result, the difference between the measurement sample (time t2) at the end of the acquisition period (not shown in FIG. 7) and the reference sample is calculated with respect to a different reference sample according to whether the lighting is considered or not as too strong by circuit 31. In such conditions, $V_{COL}(t1')=V_{INI}-V_T(FT)$ and $V_{COL}(t2)=V_{INI}-\Delta V_{COUPL}-\Delta V_I-V_T(FT)$. The difference between the two samples provides $\Delta V_{COUPL}+\Delta V_I$. Term $\Delta V_{COUPL}$ can be considered as negligible with respect to signal $\Delta V_I$. Further, it may also be compensated for as follows.

In the shown example, the voltage applied to reference electrode 33 of capacitor C1 is connectable either to ground, or to a voltage $V_{CPL}$ selected to be equal to $\Delta V_{COUPL}$. This function is illustrated by a switch K connecting electrode 33 either to ground M or to a terminal 34 of application of voltage $V_{CPL}$, switch K being controlled by a signal CPL. According to an alternative embodiment, the taking into account of coupling voltage $V_{CPL}$ which occurs for all the first samples is digitally performed, downstream, by subtraction to the values measured after conversion.

Figure 8:
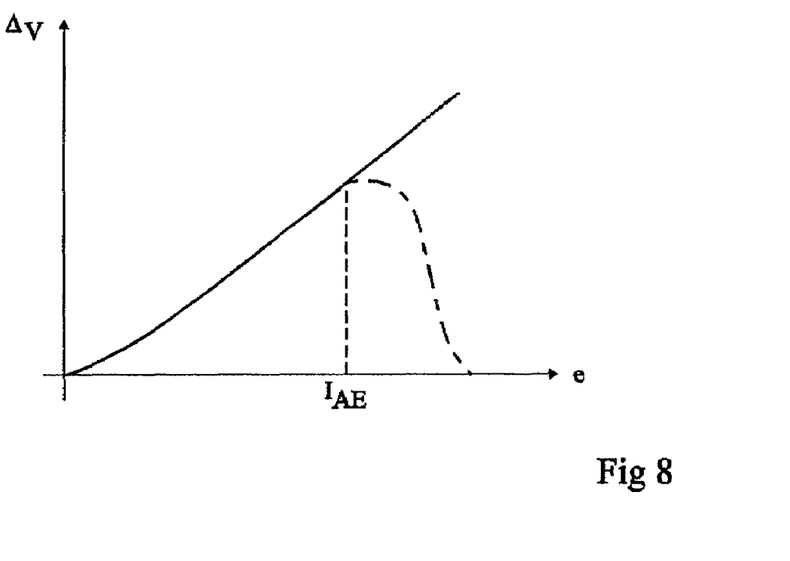
FIG. 8 illustrates the effect of the anti-eclipse circuit of FIG. 6.

FIG. 8 is a graph illustrating differentially measured voltage variation $\Delta V$ versus lighting e to illustrate a mode for determining threshold $I_{AE}$ corresponding to a limiting lighting intensity from which the eclipse problem appears (stripe-dot line illustrated in FIG. 8). Value $I_{AE}$ is taken into account to determine a threshold voltage $V_{AE}$ of triggering of circuit 31. Voltage $V_{AE}$ is provided by formula $V_{AE}=(I_{AE}/C_{pix})*g_{FT}*T_{AE}$, where $C_{pix}$ designates the equivalent pixel capacitance, where $g_{FT}$ represents the gain of follower transistor FT, and where $T_{AE}$ designates the interval necessary for circuit 31 to estimate the voltage decrease of columns.

Figure 9:
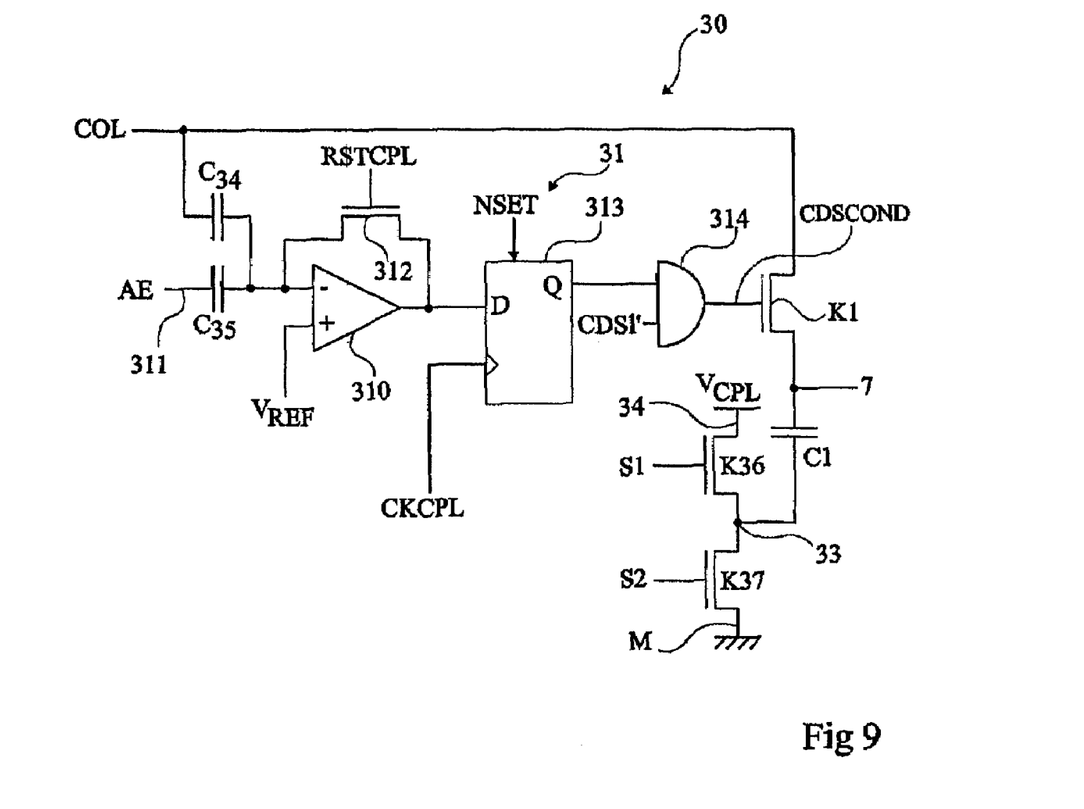
FIG. 9 shows a detailed electric diagram of an anti-eclipse circuit of the type of FIG. 6.

FIG. 9 shows a detailed embodiment of an anti-eclipse circuit 30 in accordance with the functional description of FIG. 6.

FIGS. 10A, 10B, 10C, 10D, 10E, 10F, 10G, 10H, 10I, and 10J are timing diagrams illustrating the operation of the circuit of FIG. 9.

Circuit 31 comprises a comparator 310 having a non-inverting input receiving a reference voltage $V_{REF}$ (for example, the ground) and having an inverting (comparison) input connected to a common electrode of two capacitive elements C34 and C35. The other electrode of capacitor C34 is connected to column conductor COL while the other electrode 311 of capacitor C35 is connected to a voltage source (signal AE) likely to generate a voltage step of amplitude $V_{AE}$. Capacitors C34 and C35 form a capacitive divider reproducing on the comparison input of comparator 310 the fast variations of signal AE and slow variations of signal $V_{COL}$. Comparator 310 is reset by a signal RSTCPL applied to the gate of a MOS transistor 312 connecting its comparison input to its output. The output of comparator 310 is connected to a data input D of a flip-flop 313 having its non-inverted output Q connected to a first input of a logic AND-type gate 314 having its other input receiving signal CDS1' comprising two sampling pulses (times t1' and t1) respectively during reset period RST (between times t0' and t0) and outside this period. Flip-flop 313 is synchronized by a signal CKCPL applied on its clock input. The output of gate 314 controls switch K1 (here symbolized by a MOS transistor) connecting column conductor COL to electrode 7 of capacitor C1. In the shown example, the optional application of voltage $V_{CPL}$ by switch K (FIG. 6) is performed by means of two MOS transistors K36 and K37 in series between the two terminals 34 and M of application, respectively, of voltage $V_{CPL}$ and of the ground, transistors K36 and K37 being respectively controlled by synchronization signals S1 and S2. Flip-flop 313 is set to the high state by application of an activation signal NSET to force its output to the high state before the reset period.

In a preferred embodiment, comparator 310 is formed of a MOS transistor having its source connected to ground (here functionally representing the non-inverting input), having its drain defining the output charged by a current source and having its gate (inverting input) connected to the common electrode of elements C34 and C35.

Figure 10A:
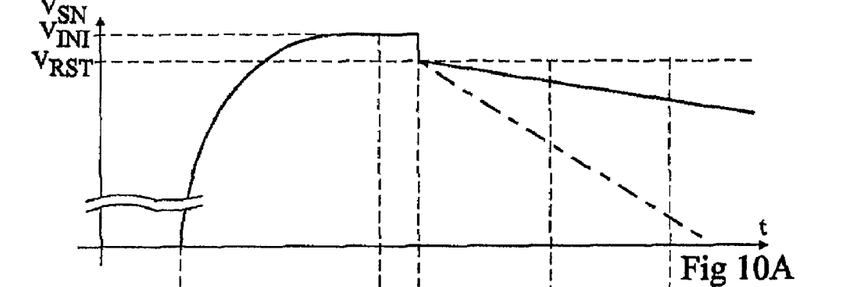
FIGS. 10A, 10B, 10C, 10D, 10E, 10F, 10G, 10H, 10I, and 10J illustrate the operation of the circuit of FIG. 9.
Figures 10B, 10C:
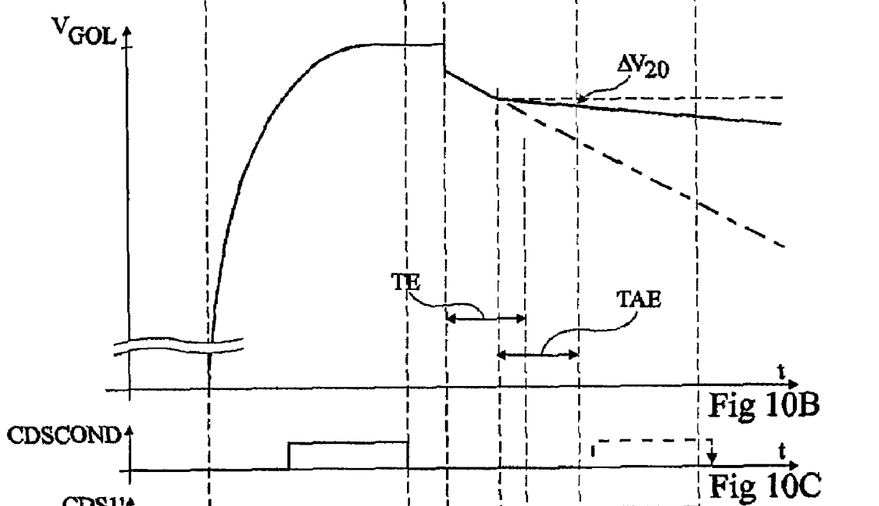
Figures 10D, 10E:
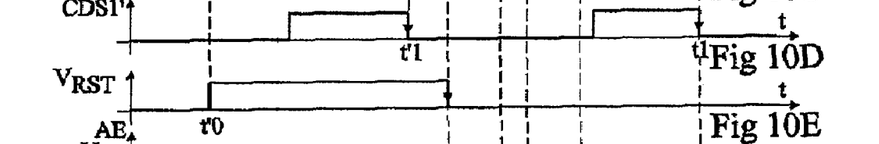
Figures 10F, 10G, 10H:
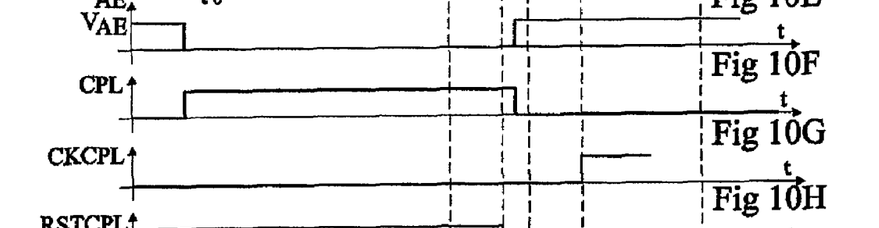
Figures 10I, 10J:
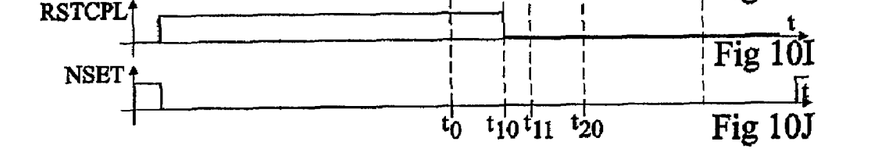

FIG. 10A shows an example of shapes of voltage $V_{SN}$ to be compared with the example of FIG. 4A. FIG. 10B shows a corresponding example of voltage $V_{COL}$. FIG. 10C shows the corresponding shape of gate signal CDSCOND of transistor K1. FIG. 10D shows the shape of sampling signal CDS1' for obtaining the reference sample. FIG. 10E shows the shape of signal $V_{RST}$. FIG. 10F shows the shape of control signal AE in application of amplitude step $V_{AE}$ onto electrode 311 of capacitor C35. FIG. 10G shows the shape of control signal CPL of switch K for application of voltage $V_{CPL}$ on electrode 33. FIG. 10H shows the shape of synchronization signal CKCPL of flip-flop 313. FIG. 10I shows the shape of signal RSTCPL for setting comparator 310. FIG. 10J shows the shape of signal NSET for activating flip-flop 313.

The interval between the two samples t1 and t1' is an accuracy/speed compromise, selected to be long enough for the variation to be detectable by circuit 31 but short enough for sample t1 to remain correct when used. This interval includes interval $T_{AE}$ and depends on the pixel characteristics.

Before the beginning (time t0') of a reset period, comparator 310 is set with respect to reference voltage $V_{REF}$ due to signal RSTCPL which transfers its output onto its comparison input. The first sampling pulse of signal CDS1' must always be transmitted to the gate of transistor K1. Accordingly, comparator 310 is deactivated by signal RSTCPL in the high state at least during the reset period (times t0' to t0) as well as, if provided, voltage $V_{CPL}$ is applied onto reference electrode 33 of capacitor C1 to take into account the coupling voltage during this first measurement. Flip-flop 313 is set (signal NSET) prior to the reset period.

At the end of the reset period (from time t0), estimation circuit 31 acts to determine whether the variation imposed on conductor COL must or not forbid the taking of sample t1. For this purpose, capacitive elements C34 and C35 introduce the respective variations of the column and of signal AE. Flip-flop 313 locks the voltage measured by the output of comparator 310, the end of the comparison being set by flip-flop control signal CKCPL (time t20). If the variation of the wanted signal is greater than high level $V_{AE}$ of signal AE, the second pulse of signal CDS1' (time t1) is masked. In time, signal CDSCOND corresponds to the effective sampling signal for the reference sample.

Voltage $V_{CPL}$ is selected to correspond to the average pixel reset coupling as seen from the column.

The order of magnitude of voltage $V_{AE}$ ranges from a few tens to a few hundreds of millivolts according to the characteristics from which an eclipse phenomenon is desired to be corrected.

The first sample (time t1') taken during the reset phase can be considered as independent from the lighting. If voltage $V_{CPL}$ is not taken into account (for example, assuming that it is applied in digital correction), the value of the first sample is $V_{COL}(t1')=V_{INI}-V_T(FT)$.

The conditional sample (time t1) provides a value replacing that of first sample t1' if the charge decrease $\Delta V_{20}$ between times t11 and t20 is slow with respect to the selected threshold. The value of this threshold t1 is $V_{COL}(t1)=V_{INI}-\Delta V_{COUPL}-\Delta V_{20}-V_T(FT)$.

The acquisition sample (time t2, FIG. 3) is independent from the used reference sample. Its value is: $V_{COL}(t2)=V_{INI}-\Delta V_{COUPL}-\Delta V-V_T(FT)$.

Accordingly, for a normal lighting, the difference between the values of the conditional sample and of the second sample provides $\Delta V-\Delta V_{20}$. For too strong a lighting, the difference between the values of the first and second samples provides $V_{CPL}-\Delta V$.

The possible dispersions of transistors ST and FT have thus been eliminated. For normal lightings, the introduced error $\Delta V_{20}$ may be neglected if duration $T_{AE}$ (interval between times t10 and t20) remains small.

An advantage of the embodiments described in relation with FIGS. 6 et seq. is that they avoid the eclipse phenomenon.

Although it applies to any type of sensor, the present invention finds a specific advantage in so-called high dynamic range sensors, that is, adapted to high lighting ranges.

Various embodiments of the present invention have been described. Various alterations and modification will occur to those skilled in the art. In particular, the practical implementation of the present invention and the definition of the different thresholds and synchronization times is within the abilities of those skilled in the art based on the functional indications given hereabove according to the characteristics of the image sensor and by using tools usual per se. Further, any digital level regeneration element may be used instead of a flip-flop in circuit 30. For example, it may be a voltage latch, a trigger, etc.

Further, although the present invention has been described in relation with an example of application to a pixel with three transistors, it also applies to the case of a pixel with four transistors.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
    acquiring an image by sampling a level of a voltage representative of a charge of a photodiode, the sampling including:
    taking a first sample, during a reset period, of the charge of the photodiode;
    determining whether a change in the voltage, after the reset period and prior to a sampling period, is lower than a threshold; and
    only if the change in the voltage after the reset period is lower than the threshold, taking a second sample after the reset period and replacing the first sample with the second sample.

2. The method of claim 1, wherein the second sample is taken after the reset period and during a time period corresponding to a sum of a voltage level settling time and of a time of determination of said change in voltage.

3. The method of claim 1, further comprising correcting the level of the first sample by a value corresponding to a coupling voltage.

4. The method of claim 1, further comprising:
taking a third sample of the voltage after the reset period;
determining a first voltage difference between the first and third samples if the change in the voltage after the reset period is not lower than the threshold; and
determining a second voltage difference between the second and third samples if the change in the voltage after the reset period is lower than the threshold, one of the first and second voltage differences corresponding to light received by the photodiode.

5. An image sensor, comprising:
an array of image acquisition cells, each provided with at least one photodiode, the cells including a first plurality of cells interconnected in a first direction to a first conductor;
a circuit for acquiring an image by sampling a level of a voltage representative of a charge of a photodiode, the circuit including:
means for taking a first sample during a reset period of the charge of the photodiode;
determining means for determining whether a change in the voltage, after the reset period and prior to a sampling period, is lower than a threshold; and
means for, only if the change in the voltage after the reset period is lower than the threshold, taking a second sample after the reset period and replacing the first with the second sample.

6. The sensor of claim 5, wherein each cell comprises:
a first transistor having a gate coupled to receive a signal for resetting the charge of the photodiode; and
second and third transistors in series between a supply terminal and said first conductor, the second transistor having a gate connected to a cathode of the photodiode and the third transistor having a gate connected to a second conductor interconnecting a second plurality of the cells of the array in a second direction.

7. The sensor of claim 5, wherein said determining means comprises a comparator structured to estimate the change in the voltage present on said first conductor with respect to the threshold.

8. The sensor of claim 7, wherein the means for taking the second sample and replacing the first sample with the second sample includes:
a digital level regeneration element having an input, coupled to an output of said comparator, and an output;
a logic element having a first input coupled to the output of the regeneration element, and second input for receiving a sampling signal, and an output for providing a control signal;
a sampling capacitor; and
a sampling transistor interposed between the first conductor and the sampling capacitor, the sampling transistor having a control terminal coupled to the output of the logic element.

9. The sensor of claim 8, wherein said regeneration element is a flip-flop.

10. An image sensor, comprising:
an image acquisition cell that includes a photodiode coupled to a conductor;
a first sampling capacitor coupled to selectively sample a voltage on the conductor representative of a charge of the photodiode;
a first switch selectively coupling the first sampling capacitor to the conductor; and
a control circuit structured to control the first switch, the control circuit being structured to turn on the first switch to enable the first sampling capacitor to take a first sample during a reset period of the charge of the photodiode, the circuit including a threshold comparator structured to turn on the first switch to enable the first sampling capacitor to take a second sample only if a change in the voltage on the conductor, after the reset period and prior to a sampling period, is lower than a threshold.

11. The sensor of claim 10, wherein the cell comprises:
a first transistor having a gate coupled to receive a signal for resetting the charge of the photodiode; and
second and third transistors in series between a supply terminal and said conductor, the second transistor having a gate connected to a cathode of the photodiode.

12. The sensor of claim 10, further comprising:
a second sampling capacitor coupled to selectively sample the voltage on the conductor representative of the charge of the photodiode; and
a second switch selectively coupling the second sampling capacitor to the conductor.

13. The sensor of claim 10, wherein the control circuit includes:
a digital level regeneration element having an input, coupled to an output of said threshold comparator, and an output; and
a logic element having a first input coupled to the output of the regeneration element, and second input for receiving a sampling signal, and an output for providing a control signal coupled to a control terminal of the first switch.

14. The sensor of claim 13, wherein said regeneration element is a flip-flop.

15. The sensor of claim 10, further comprising a second switch structured to selectively couple the first sampling capacitor to ground and a voltage selected to compensate for a negative coupling due to the turning-off a reset transistor which ends the reset period.

16. The method of claim 1, wherein the second sample is taken after the reset period and prior to the sampling period.

17. The sensor of claim 5, wherein the second sample is taken after the reset period and prior to the sampling period.

18. The sensor of claim 10, wherein the second sample is taken after the reset period and prior to the sampling period.

19. A method, comprising:
acquiring an image by sampling a level of a voltage representative of a charge of a photodiode, the sampling including:
taking a first sample during a reset period of the charge of the photodiode;
determining whether a change in the voltage after the reset period is lower than a threshold; and
if the change in the voltage after the reset period is lower than the threshold, taking a second sample after the reset period and replacing the first with the second sample, wherein the second sample is taken after the reset period and during a time period corresponding to a sum of a voltage level settling time and of a time of determination of said change in voltage.

20. The method of claim 19, further comprising:
taking a third sample of the voltage after the reset period;
determining a first voltage difference between the first and third samples if the change in the voltage after the reset period is not lower than the threshold; and
determining a second voltage difference between the second and third samples if the change in the voltage after the reset period is lower than the threshold, one of the first and second voltage differences corresponding to light received by the photodiode.

21. An image sensor, comprising:

an array of image acquisition cells, each provided with at least one photodiode, the cells including a first plurality of cells interconnected in a first direction to a first conductor;

a circuit for acquiring an image by sampling a level of a voltage representative of a charge of a photodiode, the circuit including:

means for taking a first sample during a reset period of the charge of the photodiode;

determining means for determining whether a change in the voltage after the reset period is lower than a threshold; and means for, if the change in the voltage after the reset period is lower than the threshold, taking a second sample after the reset period and replacing the first with the second sample, wherein the means for taking the second sample and replacing the first sample with the second sample includes:

a digital level regeneration element having an input, coupled to an output of said comparator, and an output;

a logic element having a first input coupled to the output of the regeneration element, and second input for receiving a sampling signal, and an output for providing a control signal;

a sampling capacitor; and a sampling transistor interposed between the first conductor and the sampling capacitor, the sampling transistor having a control terminal coupled to the output of the logic element.

22. The sensor of claim 21, wherein each cell comprises:

a first transistor having a gate coupled to receive a signal for resetting the charge of the photodiode; and second and third transistors in series between a supply terminal and said first conductor, the second transistor having a gate connected to a cathode of the photodiode and the third transistor having a gate connected to a second conductor interconnecting a second plurality of the cells of the array in a second direction.

23. The sensor of claim 21, wherein said determining means comprises a comparator structured to estimate the change in the voltage present on said first conductor with respect to the threshold.

24. The sensor of claim 21, wherein said regeneration element is a flip-flop.

25. An image sensor, comprising:

an image acquisition cell that includes a photodiode coupled to a conductor;

a first sampling capacitor coupled to selectively sample a voltage on the conductor representative of a charge of the photodiode;

a first switch selectively coupling the first sampling capacitor to the conductor; and a control circuit structured to control the first switch, the control circuit being structured to turn on the first switch to enable the first sampling capacitor to take a first sample during a reset period of the charge of the photodiode, the circuit including a threshold comparator structured to turn on the first switch to enable the first sampling capacitor to take a second sample if a change in the voltage on the conductor, after the reset period is lower than a threshold, wherein the control circuit includes:

a digital level regeneration element having an input, coupled to an output of said threshold comparator, and an output; and a logic element having a first input coupled to the output of the regeneration element, and second input for receiving a sampling signal, and an output for providing a control signal coupled to a control terminal of the first switch.

26. The sensor of claim 25, wherein the cell comprises:

a first transistor having a gate coupled to receive a signal for resetting the charge of the photodiode; and second and third transistors in series between a supply terminal and said conductor, the second transistor having a gate connected to a cathode of the photodiode.

27. The sensor of claim 25, further comprising:

a second sampling capacitor coupled to selectively sample the voltage on the conductor representative of the charge of the photodiode; and a second switch selectively coupling the second sampling capacitor to the conductor.

28. The sensor of claim 25, wherein said regeneration element is a flip-flop.

* * * * *